US008909516B2

(12) United States Patent
Medero et al.

(10) Patent No.: US 8,909,516 B2
(45) Date of Patent: Dec. 9, 2014

(54) FUNCTIONALITY FOR NORMALIZING LINGUISTIC ITEMS

(75) Inventors: Julie A. Medero, Seattle, WA (US); Daniel S. Morris, Bellevue, WA (US); Lucretia H. Vanderwende, Sammamish, WA (US); Michael Gamon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 13/313,034

(22) Filed: Dec. 7, 2011

(65) Prior Publication Data

US 2013/0110497 A1 May 2, 2013

Related U.S. Application Data

(60) Provisional application No. 61/551,938, filed on Oct. 27, 2011.

(51) Int. Cl.
*G06F 17/20* (2006.01)
*G06F 17/28* (2006.01)
*G06F 17/27* (2006.01)
*G06F 17/21* (2006.01)
*G10L 21/00* (2013.01)
*G10L 15/26* (2006.01)
*G10L 17/00* (2013.01)

(52) U.S. Cl.
CPC ..................................... *G06F 17/27* (2013.01)
USPC ................ 704/9; 704/1; 704/2; 704/3; 704/4; 704/5; 704/6; 704/7; 704/8; 704/10; 704/270; 704/270.1; 704/275; 704/235; 704/246

(58) Field of Classification Search
CPC . G06F 17/27; G06F 17/2705; G06F 17/2735; G06F 17/2755; G06F 17/277; G06F 17/2775; G06F 17/2795; G06F 17/28; G06F 17/2809; G06F 17/2818; G06F 17/289; G06F 17/2785; G06F 17/21; G10L 21/00; G10L 15/26; G10L 21/06; G10L 15/00; G10L 15/18
USPC ............. 704/1–10, 235, 246, 270, 270.1, 275
See application file for complete search history.

(56) References Cited

U.S. PATENT DOCUMENTS 4,797,855 A * 1/1989 Duncan et al. ................. 715/236
6,470,362 B1 * 10/2002 Eustace et al. ................. 715/234
(Continued)

OTHER PUBLICATIONS

Shapiro, Alan R. "Taming variability in free text: application to health surveillance." MMWR Morb Mortal Wkly Rep 53.Suppl (2004): 95-100.*

(Continued)

*Primary Examiner* — Edgar Guerra-Erazo
(74) *Attorney, Agent, or Firm* — Steve Wight; Judy Yee; Micky Minhas

(57) ABSTRACT

Computing functionality converts an input linguistic item into a normalized linguistic item, representing a normalized counterpart of the input linguistic item. In one environment, the input linguistic item corresponds to a complaint by a person receiving medical care, and the normalized linguistic item corresponds to a definitive and error-free version of that complaint. In operation, the computing functionality uses plural reference resources to expand the input linguistic item, creating an expanded linguistic item. The computing functionality then forms a graph based on candidate tokens that appear in the expanded linguistic item, and then finds a shortest path through the graph; that path corresponds to the normalized linguistic item. The computing functionality may use a statistical language model to assign weights to edges in the graph, and to determine whether the normalized linguistic incorporates two or more component linguistic items.

20 Claims, 12 Drawing Sheets

(56) References Cited

U.S. PATENT DOCUMENTS

| | | | |
|---|---|---|---|
| 6,714,905 B1* | 3/2004 | Chang et al. | 704/9 |
| 6,721,697 B1* | 4/2004 | Duan et al. | 704/9 |
| 7,028,038 B1 | 4/2006 | Pakhomov | |
| 7,203,635 B2* | 4/2007 | Oliver et al. | 703/22 |
| 7,440,941 B1* | 10/2008 | Borkovsky et al. | 1/1 |
| 7,912,717 B1* | 3/2011 | Galick | 704/256 |
| 8,069,027 B2* | 11/2011 | Liu et al. | 704/2 |
| 8,700,384 B1* | 4/2014 | Lattyak | 704/8 |
| 2003/0105638 A1* | 6/2003 | Taira | 704/275 |
| 2004/0167771 A1* | 8/2004 | Duan et al. | 704/10 |
| 2005/0240439 A1 | 10/2005 | Covit et al. | |
| 2006/0015317 A1* | 1/2006 | Nakagawa | 704/1 |
| 2008/0270120 A1 | 10/2008 | Pestian et al. | |
| 2009/0089046 A1* | 4/2009 | Uchimoto et al. | 704/9 |
| 2009/0119095 A1 | 5/2009 | Beggelman et al. | |
| 2009/0228299 A1 | 9/2009 | Kangarloo et al. | |
| 2010/0299132 A1* | 11/2010 | Dolan et al. | 704/2 |

OTHER PUBLICATIONS

Pakhomov, Serguei. "Semi-supervised maximum entropy based approach to acronym and abbreviation normalization in medical texts." Proceedings of the 40th annual meeting on association for computational linguistics. Association for Computational Linguistics, 2002.*

Spyns, Peter. "Natural language processing in medicine: an overview." Methods of information in medicine 35.4-5 (1996): 285-301.*

Travers, Debbie A., and Stephanie W. Haas. "Using nurses' natural language entries to build a concept-oriented terminology for patients' chief complaints in the emergency department." Journal of biomedical informatics 36.4 (2003): 260-270.*

Travers, Debbie A., and Stephanie W. Haas. "Evaluation of emergency medical text processor, a system for cleaning chief complaint text data." Academic emergency medicine 11.11 (2004): 1170-1176.*

Bilenko, Mikhail, et al. "Adaptive name matching in information integration." IEEE Intelligent Systems 18.5 (2003): 16-23.*

Navarro, Gonzalo. "A guided tour to approximate string matching." ACM computing surveys (CSUR) 33.1 (2001): 31-88.*

Ristad, Eric Sven, and Peter N. Yianilos. "Learning string-edit distance." Pattern Analysis and Machine Intelligence, IEEE Transactions on 20.5 (1998): 522-532.*

Tolentino, et al., "A UMLS-Based Spell Checker for Natural Language Processing in Vaccine Safety," retrieved at <<http://www.biomedcentral.com/content/pdf/1472-6947-7-3.pdf>>, BMC Medical Informatics and Decision Making, vol. 7, No. 1, Feb. 12, 2007, 13 pages.

Hettne, et al., "Rewriting and Suppressing UMLS Terms for Improved Biomedical Term Identification," retrieved at <<http://www.ncbi.nlm.nih.gov/pmc/articles/PMC2895736/pdf/2041-1480-1-5.pdf>>, Journal of Biomedical Semantics, vol. 1, No. 1, 2010, 9 pages.

"Emergency Medical Text Processor," retrieved at <<http://nursing.unc.edu/emtp/about/index.htm>>, retrieved on Nov. 23, 2011, The University of North Carolina at Chapel Hill, dated Feb. 11, 2009, 3 pages.

Haas, et al., "Toward Vocabulary Control for Chief Complaint," retrieved at <<http://digitalcommons.unl.edu/cgi/viewcontent.cgi?article=1028&context=publichealthresources>>, Academic Emergency Medicine, vol. 15, No. 5, May 2008, pp. 476-482.

Dara, et al., "Chief Complaint Preprocessing Evaluated on Statistical and Non-statistical Classifiers," retrieved at <<http://www.isdsjournal.org/articles/778.pdf>>, Advances in Disease Surveillance, 2:4, 2007, 1 page.

Travers, et al., "The Unified Medical Language System © Coverage of Emergency Department Chief Complaints," retrieved at <<http://onlinelibrary.wiley.com/doi/10.1197/j.aem.2006.06.054/pdf>>, Academic Emergency Medicine, vol. 13, No. 12, Dec. 2006, pp. 1319-1323.

Travers, et al., "Evaluation of Emergency Medical Text Processor for Pre-processing Chief Complaint Data for Syndromic Surveillance," retrieved at <<http://www.isdsjournal.org/articles/127.pdf>>, Advances in Disease Surveillance, 2006, 1:71, 1 page.

Travers, et al., "Evaluation of Emergency Medical Text Processor, a System for Cleaning Chief Complaint Textual Data," retrieved at <21 http://onlinelibrary.wiley.com/doi/10.1197/j.aem.2004.08.012/pdf>>, Academic Emergency Medicine, vol. 11, No. 11, Nov. 2004, pp. 1170-1176.

Travers, et al., "Using Nurses' Natural Language Entries to Build a Concept-oriented Terminology for Patients' Chief Complaints in the Emergency Department," retrieved at <<http://miksa.ils.unc.edu/~deepika/UsingNursesNLEntries_Travers_EMTP.PDF>>, Journal of Biomedical Informatics, vol. 36, 2003, pp. 260-270.

Aswell, et al., "Enhanced Normalization of Emergency Department Chief Complaints," retrieved at <<http://telemedicina.unifesp.br/pub/AMIA/2007%20AMIA%20Proceedings/data/papers/posters/AMIA-0143-S2007.pdf>>, AMIA Annu Symp Proc., 2007, p. 864.

Niiranen, et al., "Toward Reflective Management of Emergency Department Chief Complaint Information," retrieved at <<http://ieeexplore.ieee.org/stamp/stamp.jsp?tp=&arnumber=4534354>>, IEEE Transactions on Information Technology in Biomedicine, vol. 12, No. 6, Nov. 2008, pp. 763-767.

Travers, et al., "Evaluation of a Chief Complaint Pre-Processor for Biosurveillance," retrieved at <<http://www.ncbi.nlm.nih.gov/pmc/articles/PMC2655903/>>, AMIA Annu Symp Proc., 2007, 8 pages.

Yli-Hietanen, et al., "Domain-specific Analytical Language Modeling—The Chief Complaint as a Case Study," retrieved at <<http://www.ijmijournal.com/article/S1386-5056(09)00019-7/abstract>>, International Journal of Medical Informatics, vol. 78, No. 12, 2008, pp. 27-30.

* cited by examiner

FUNCTIONALITY FOR NORMALIZING LINGUISTIC ITEMS

This application claims the benefit of U.S. Provisional Application No. 61/551,938 (the '938 application), filed Oct. 27, 2011. The '938 application is incorporated by reference herein in its entirety.

BACKGROUND

A caregiver typically takes various notes pertaining to the care of patients. For example, the caregiver may record a principal complaint identified by a patient regarding his or her condition, known as a "chief complaint." For efficiency, the caregiver may record the chief complaint in abbreviated form, such as by writing "s/o/b" or "sob" for the chief complaint of "shortness of breath." A caregiver may enter this information using any technique or combination of techniques, such as by using a keypad entry mechanism, a handwriting capture mechanism, a voice recognition input mechanism, etc. A hospital or clinic can use the chief complaint conveyed by a patient in various ways. For example, the hospital can use this information to provide timely care to the patient, especially in an emergency situation.

However, the chief complaint that is entered in the above-described manner is prone to ambiguity and error. For instance, the caregiver who enters the chief complaint may enter erroneous information, such as by misspelling a word. For example, the caregiver may input the chief complaint "chest pain shortness of breath," instead of the correctly-spelled text "chest pain shortness of breath." In addition or alternatively, the caregiver may use inconsistent abbreviations to shorten chief complaints. For example, the caregiver may express the above-identified chief complaint ("chest pain shortness of breath") by entering any of "cp sob," "c/p sob," "sob/cp," "sob cp," "chesp pain sob," "sob/chest pain/," "cp difficulty breathing," and so on. More generally, ambiguity in chief complaints may stem from multiple factors, including any combination of: the use of multiple inconsistent ways of writing abbreviations; spelling errors; re-ordering of terms in idiosyncratic ways; the use of multiple inconsistent conventions for expressing punctuation; the inclusion of multiple complaints in a single entry; and the general ambiguity that is inherent in any natural language (e.g., as exhibited by the use of "difficulty breathing" and "shortness of breath" to represent the same complaint). These ambiguities may be exacerbated in those environments in which caregivers provide their notes in voice form and/or in handwriting form; in this situation, an automated or manual transcription service may have difficulty parsing and understanding the complaint the caregiver has vocalized or written.

Various negative consequences may ensue from ambiguity in chief complaints. For example, the ambiguity may result in inefficiencies in categorizing the chief complaints. In extreme cases, the ambiguity may result in the failure to provide appropriate care to patients in a timely manner.

The above-described issues are not limited to the medical (e.g., health-related) environment, but rather extend to any environment that involves the capture of potentially ambiguous linguistic information pertaining to a particular domain of subject matter.

SUMMARY

A system is described herein for converting an input linguistic item into a normalized linguistic item. In one environment, the input linguistic item corresponds to a complaint conveyed by a person receiving medical care, and is referred to herein as an input complaint item. The normalized linguistic item corresponds to a normalized (e.g., definitive and error-free) counterpart of the input complaint item, and is referred to herein as a normalized complaint item.

In one implementation, the system operates by receiving the input complaint item and then partitioning it into one or more tokens (e.g., terms). The system then expands each of the input tokens in the input complaint item into a list of one or more candidate tokens, to provide an expanded linguistic item. To perform this task, the system may rely on plural reference sources, including plural spelling correctors. The system then creates a graph based on the expanded linguistic item. The system can assign weights to the edges in the graph based on multiple considerations. For example, the system can assign weights to the edges based, in part, on likelihoods expressed by a statistical language model. The system then identifies a shortest path through the graph. That shortest path corresponds to the normalized complaint item.

According to another illustrative feature, the system can also use the language model to determine whether the normalized complaint item (identified in the manner described above) includes a split point which demarcates two component complaint items within the normalized complaint item. The system can then separate the normalized complaint item into its constituent parts.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality converting an input linguistic item into a corresponding normalized linguistic item. Section B describes illustrative methods which explain the operation of the functionality of Section A. Section C describes illustrative computing functionality that can be used to implement any aspect of the features described in Sections A and B.

Figure 13:
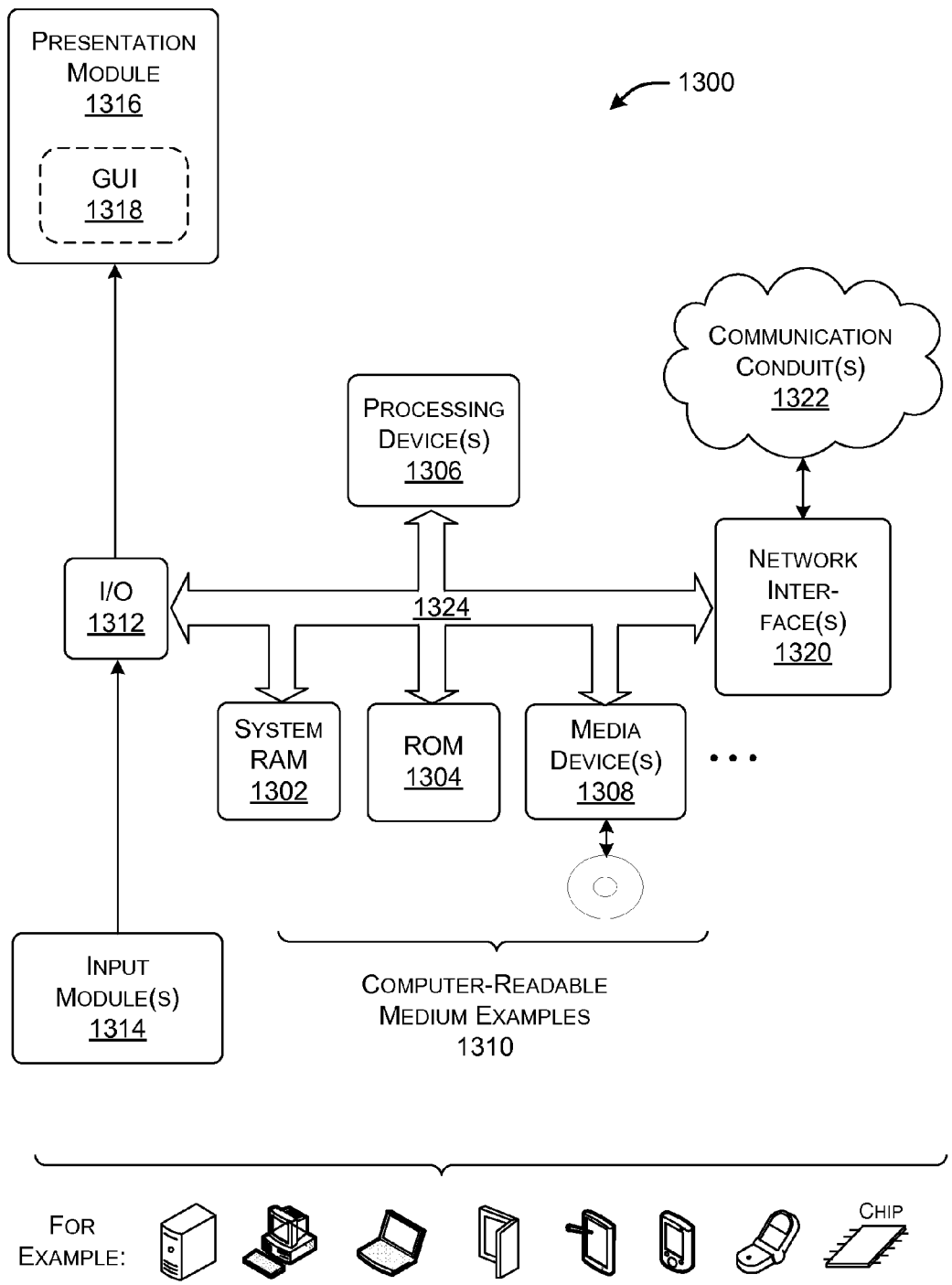
FIG. 13 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 13, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
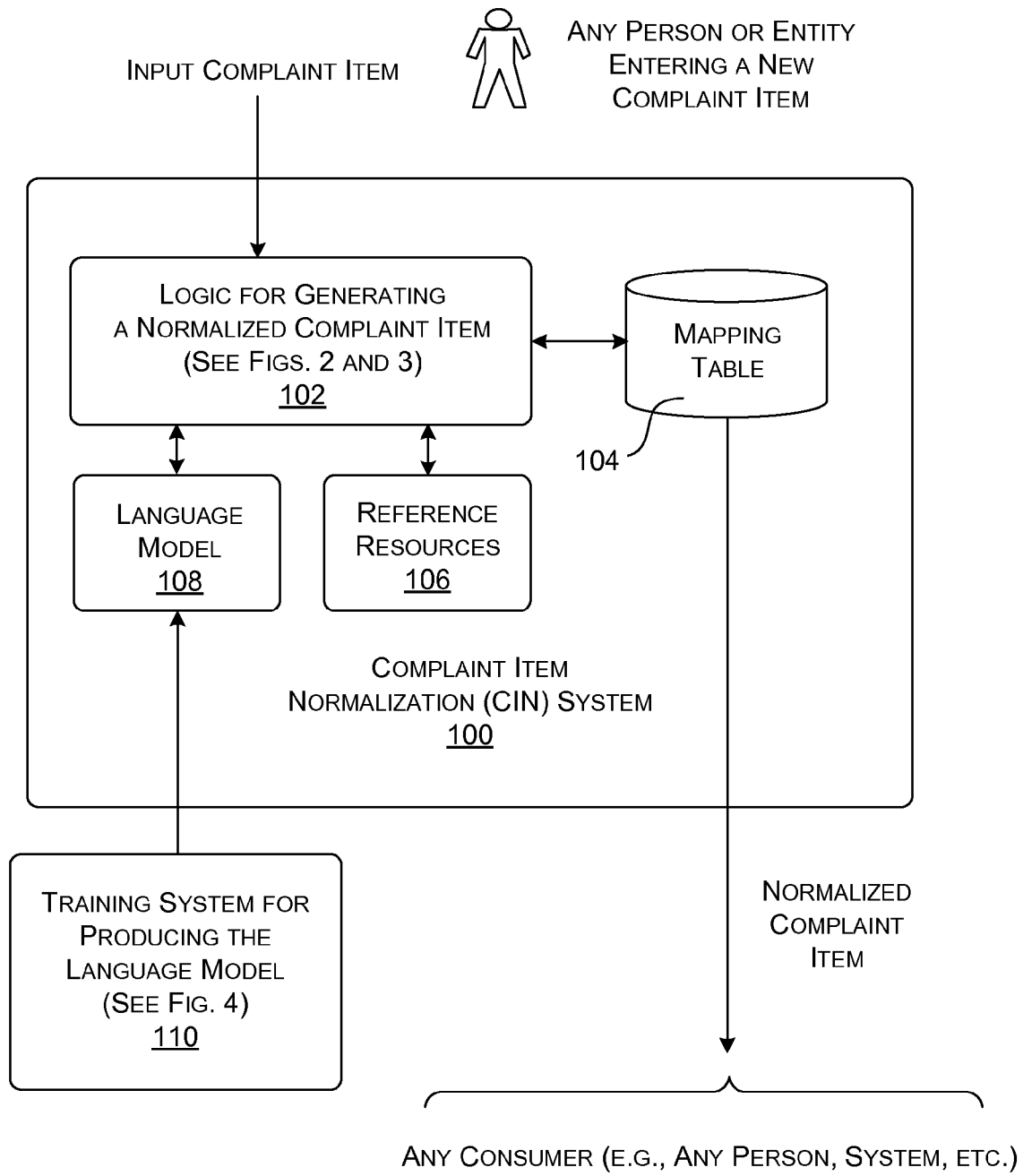
FIG. 1 shows an overview of an illustrative complaint item normalization (CIN) system for converting an input complaint item into a corresponding normalized complaint item.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Systems FIG. 1 shows an illustrative system 100 for converting an input linguistic item into a normalized counterpart thereof, referred to as a normalized linguistic item. As used herein, a linguistic item may correspond to a sequence of one or more tokens. Each token (i.e., term), in turn, may comprise one or more characters. To provide one non-limiting example, a linguistic item may correspond to one or more words and/or abbreviations which can be partitioned in the manner described below. The normalized version of the input linguistic item may represent a definitive and error-free way of representing the semantic content that is conveyed by the input linguistic item. For example, in one implementation, the input linguistic item may contain misspellings, idiosyncratic words ordering, and various ad hoc abbreviations, etc. The normalized counterpart of this input linguistic item may express the tokens in the input linguistic item in an expanded, correctly-spelled, and correctly-ordered form.

The system 100 can be applied to any environment in which users or other entities enter linguistic items pertaining to any subject matter domain, where those items may potentially contain ambiguities. However, to facilitate explanation, the following description will primarily set forth the construction and operation of the system 100 in a medical environment. In this context, a caregiver or other user (or system) enters an input complaint item that expresses a patient's medical-related (e.g., health-related) complaint, relevant to any field of medical practice. For example, the patient may state that he or she is experiencing shortness of breath and dizziness. As set forth above, the input complaint item may be ambiguous due to one or more factors. The system 100 addresses this issue by generating a normalized counterpart of the input complaint item, i.e., a normalized complaint item. In this context, the system 100 itself is referred to as a complaint item normalization (CIN) system 100.

To emphasize, however, other environments can make use of the system 100. For example, various scientific, engineering, academic, law enforcement, and business environments can make use of the system 100. For instance, a scientist or engineer can use the system 100 to normalize scientific notes in the course of making scientific observations regarding any subject. In another case, a merchant can use the system 100 to normalize comments regarding products. In another case, a government or private-sector inspector can use the system 100 to normalize notes regarding objects that he or she is inspecting (e.g., houses, automobiles, tracts of land), and so on.

Figure 2:
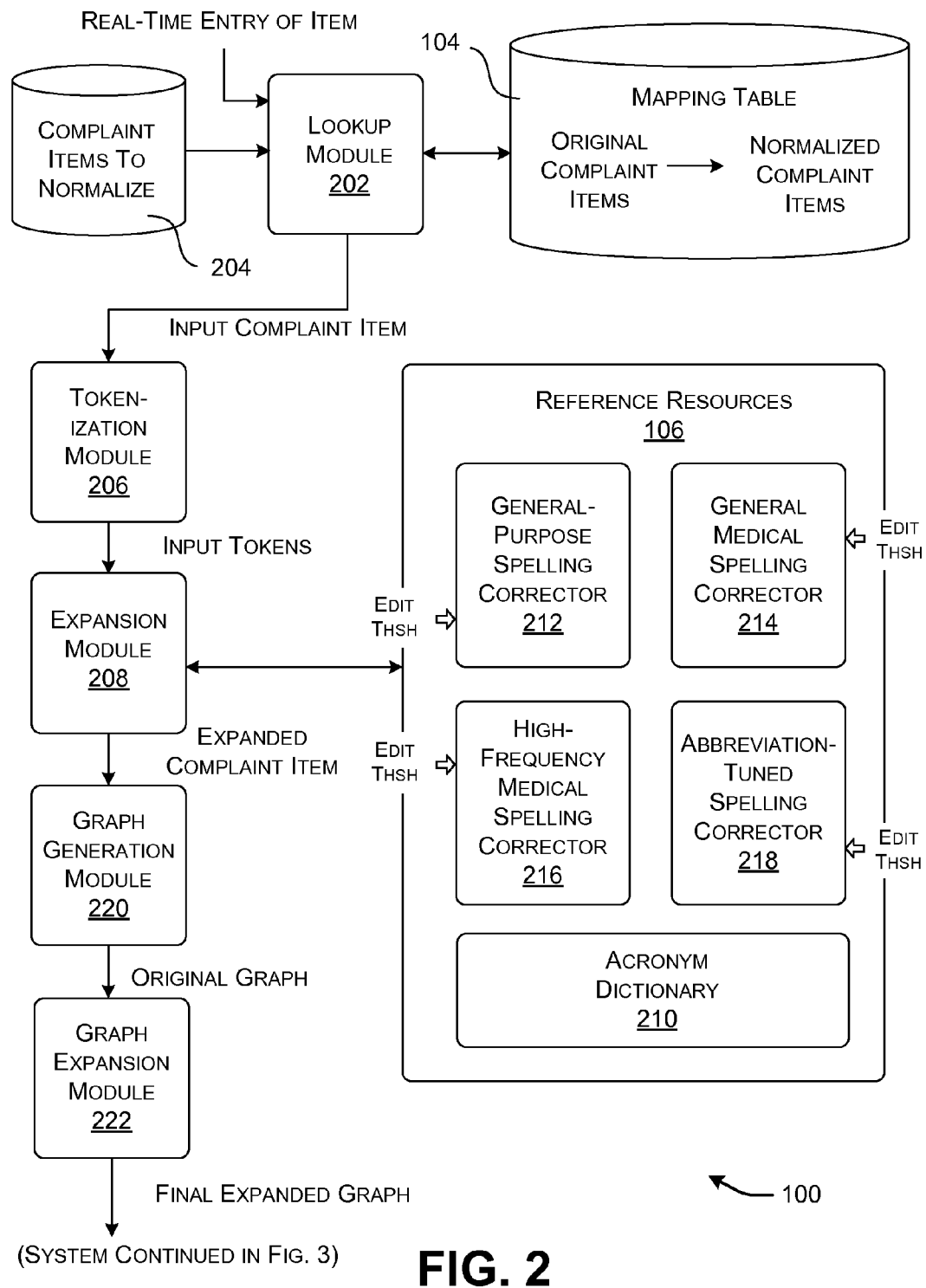
FIGS. 2 and 3 show one implementation of the CIN system of FIG. 1.
Figure 3:
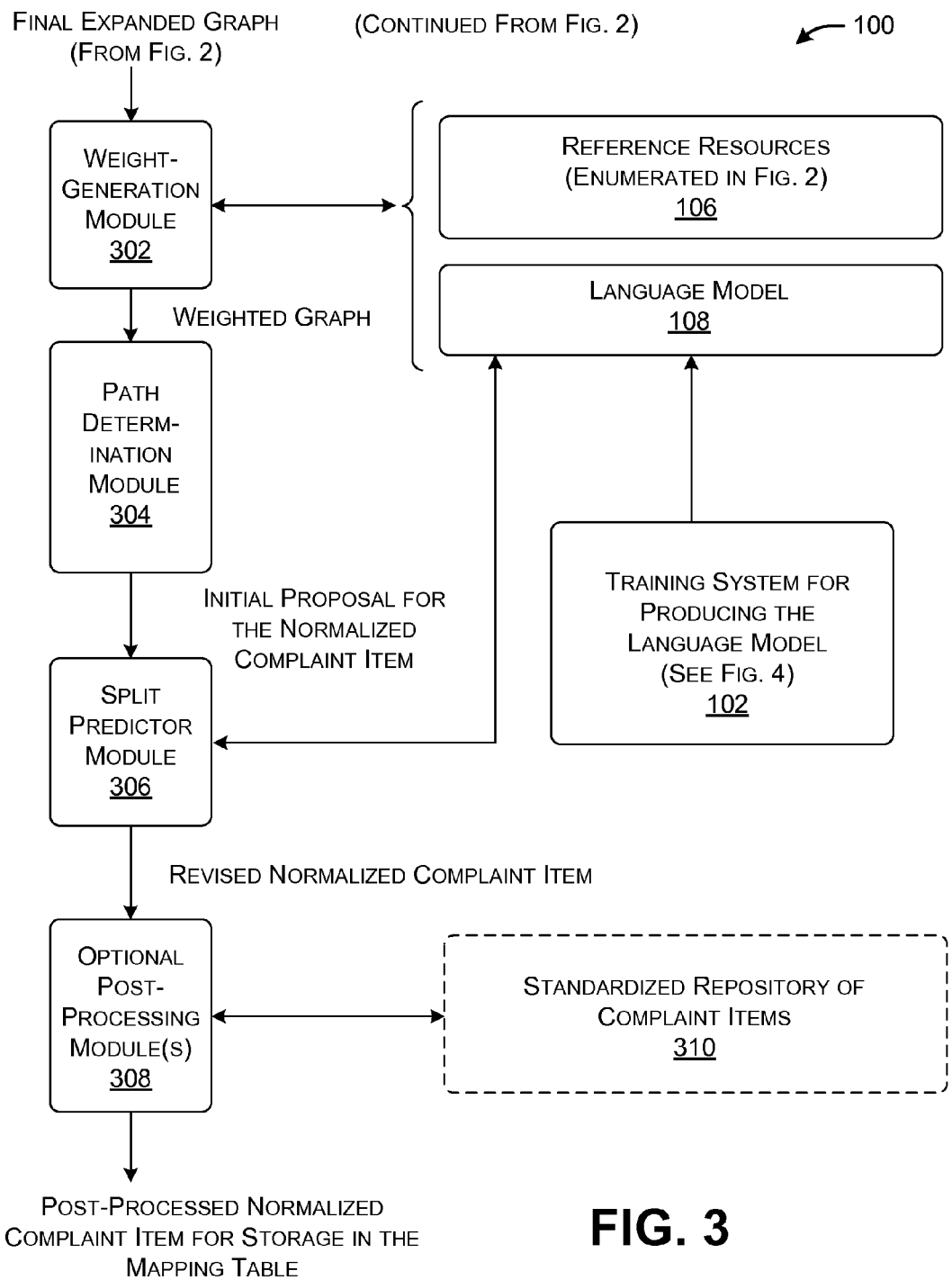
Figure 4:
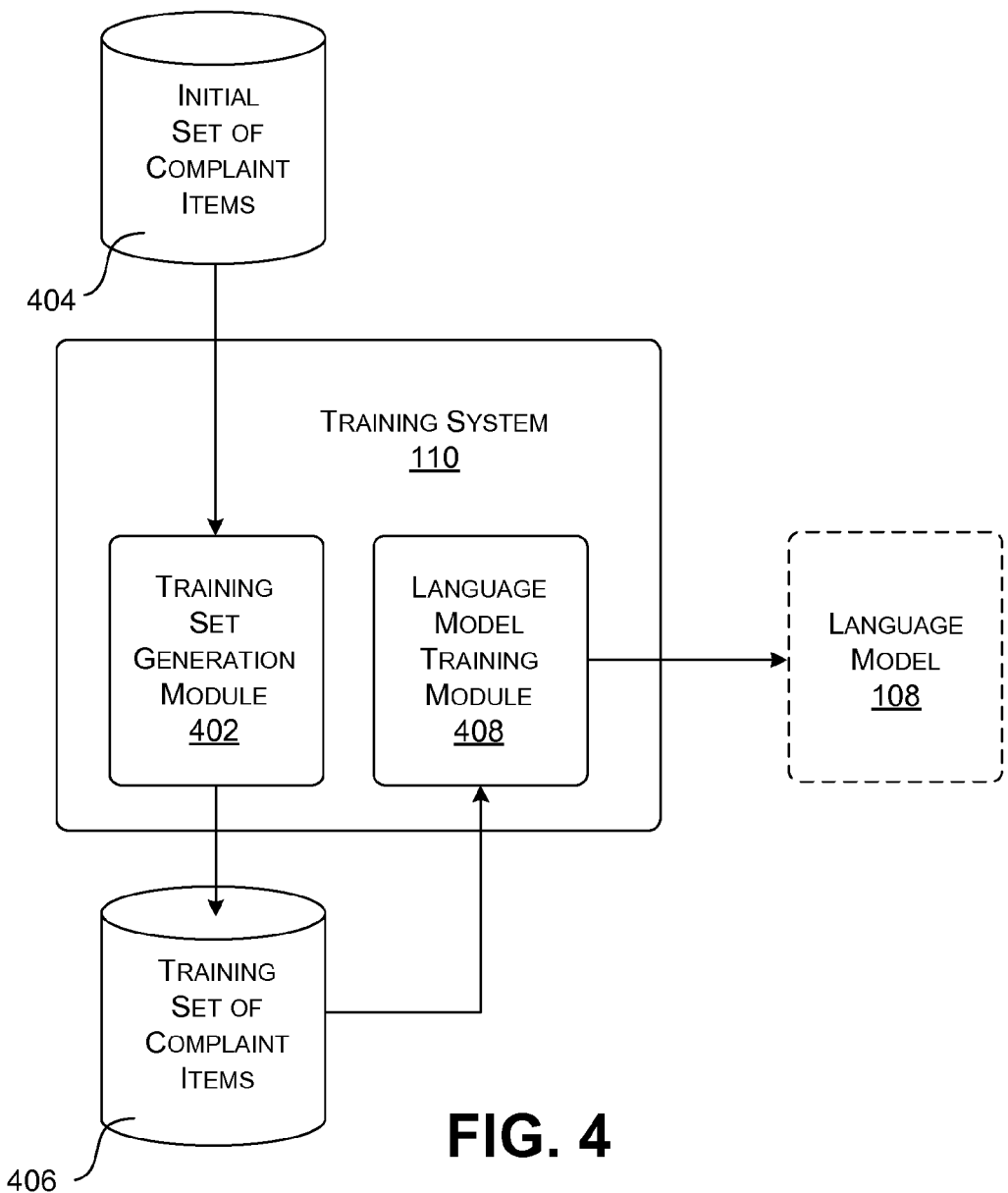
FIG. 4 shows a training system for generating a language model; that language model, in turn, is used by the CIN system of FIG. 1.

This section presents an overview of illustrative components that can be used to implement the CIN system 100. More specifically, FIG. 1 shows a broad overview of the CIN system 100, while FIGS. 2-4 provide additional details regarding individual components that can be used within or in conjunction with the CIN system 100. Section B provides a yet more detailed description of the manner of operation of the CIN system 100.

Starting with FIG. 1, the CIN system includes logic 102 for converting a new input complaint item into a normalized complaint item. This logic 102 is depicted more fully in FIGS.

2 and 3. By way of broad overview, when the logic 102 receives an input linguistic item, it first consults a mapping table provided in a data store 104. The mapping table maps previously-encountered linguistic items to their respective normalized counterparts. If the logic 102 does not identify the normalized linguistic item by consulting the mapping table, it derives the normalized linguistic item in a multi-stage process.

More specifically, to derive the normalized linguistic item, the logic 102 relies on a collection of reference resources 106 and a language model 108. As will be described below, the logic 102 uses the reference resources 106 to expand each token t in the input complaint item into a list of one or more candidate tokens. Each candidate token represent a possible interpretation of the token t in the input complaint item. This process produces an expanded complaint item according to the terminology used herein. The logic 102 then constructs a graph based on the expanded complaint item.

The logic 102 uses the language model 108 to assign weights to edges in the graph. The logic 102 then uses a shortest path algorithm to identify a shortest path through the graph. That shortest path represents a sequence of tokens that, taken together, correspond to an initially-proposed normalized complaint item. The logic 102 also uses the language model 108 to ascertain whether the thus-identified normalized complaint item incorporates two or more distinct complaint items.

Figure 8:
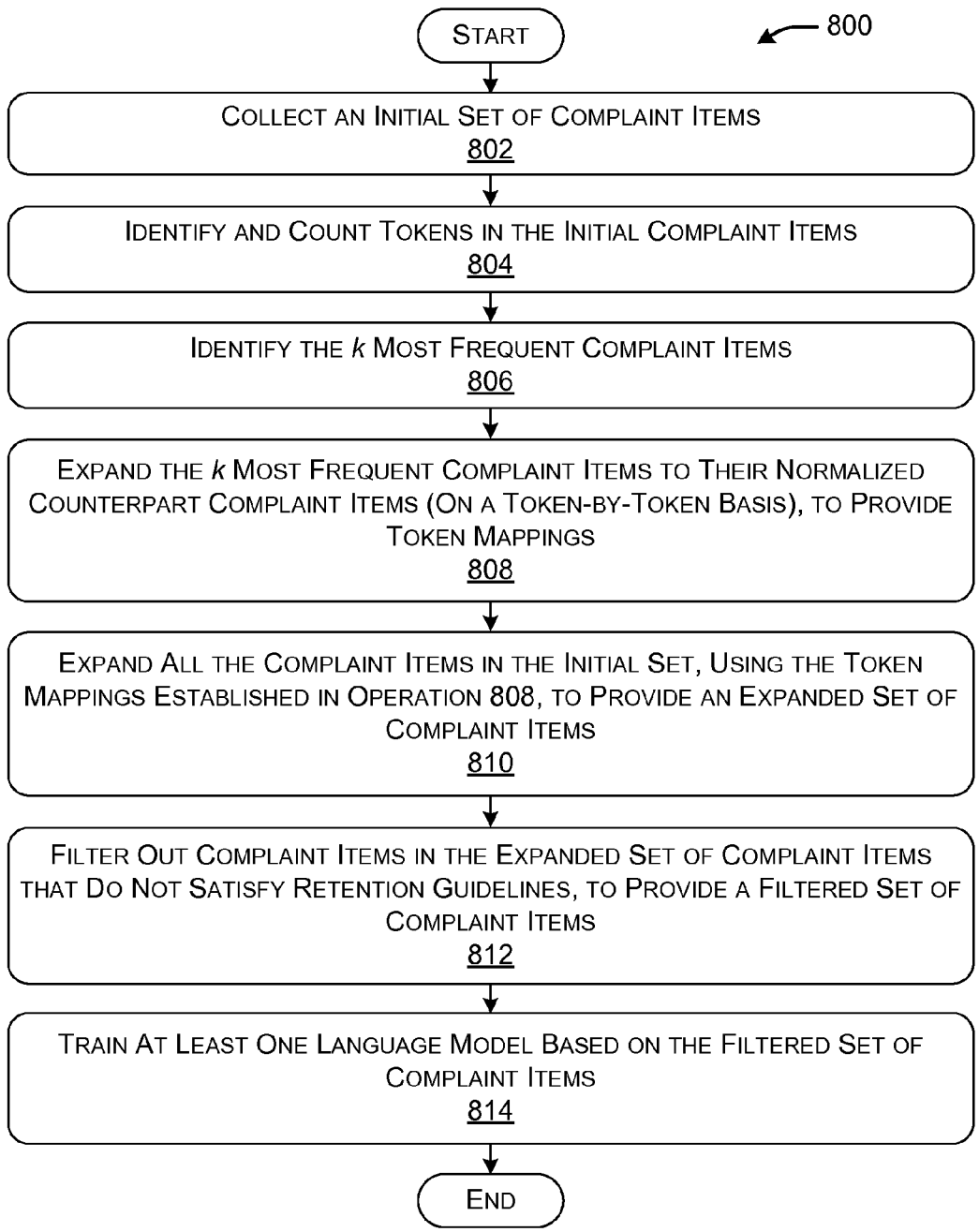
FIG. 8 shows a procedure which explains one manner of operation of the training system of FIG. 4.

A training system 110 generates the language model 108 based on a training corpus, in a manner set forth more fully in the context of FIG. 4 (and yet more fully in the context of FIG. 8).

Different environments can make different uses of the normalized complaint item that is generated by the CIN system 100. In one case, an environment can use the normalized complaint item to accurately index the information conveyed by a patient. This allows an automated alert system, in turn, to identify a patient condition that requires immediate attention. An automated alert system can also use the normalized complaint item to flag problematic treatment being administered to the patient. For example, by correctly identifying that a patient is complaining about a breathing restriction, a caregiver may more quickly identify a drug regimen that is causing an allergic reaction in the patient, and thus restricting his or her breathing. In another case, a billing system or other administrative system can use the normalized complaint item to facilitate the generation of appropriate records for the patient in question. In another case, an environment can present the normalized complaint item to the patient. This allows the patient to quickly verify whether his or her complaint has been correctly interpreted by the caregiver. In another case, a research community can use a corpus of normalized complaint items to perform any analysis on a population of patients, e.g., to identify emerging disease-related trends or caregiving patterns, etc. These applications are cited by way of illustration, not limitation; other environments can make other uses of the normalized complaint items.

FIGS. 2 and 3 together provide additional details regarding the CIN system 100 introduced in FIG. 1. To begin with, a lookup module 202 can receive a new complaint item from one or more sources. In one case, the lookup module 202 can receive a complaint item that is entered by a caregiver or other individual in a real-time fashion, e.g., soon after the patient conveys the complaint item and the caregiver enters the complaint item. The caregiver can use any mechanism to enter the complaint item, such as by using a keypad mechanism, a touchscreen mechanism, a mouse device and/or joystick mechanism, a voice recognition mechanism, a handwriting input mechanism, and so on. Alternatively, or in addition, the lookup module 202 can receive the new complaint item from a collection of previously-stored items provided in a data store 204. In that context, the lookup module 202 can process a batch of such new complaint items, e.g., by processing the items in series and/or in parallel.

As described above in connection with FIG. 1, the lookup module 202 consults a mapping table (provided in the data store 104) to determine whether a normalized counterpart of the input complaint item already exists (e.g., because it has been previously generated and stored). If the mapping table does not contain the normalized complaint item, the lookup module 202 forwards the input complaint item to a series of modules which, together, generate the normalized complaint item.

To begin with, a tokenization module 206 breaks the input complaint item into one or more components. As explained above, a token corresponds to a collection of one or more characters that are separated from at least one neighboring token by one or more white spaces and/or other demarcating character(s). These types of tokens represent the smallest gradation of tokens in the input complaint item. As will be clarified below, the tokenization module 206 can also identify aggregate tokens. Each aggregate token represents a combination of one or more smaller tokens. For example, the tokenization module 206 can identify an aggregate token of "sob" based on smaller tokens of "s," "o," and "b," which are extracted from the input complaint item "s/o/b." In other words, the tokenization module 206 can take into account alternative parsing strategies when identifying tokens in the input linguistic item. Section B provides additional details regarding one manner in which tokenization can be performed, e.g., with respect to block 908 of FIG. 9.

An expansion module 208 uses the reference resources 106 to expand each token identified in the input complaint item into a list of one or more candidate tokens. This produces an expanded complaint item. More specifically, in some cases, the expansion module 208 can make conditional use of the reference resources 106. For example, the expansion module 208 can feed a token t into a particular reference resource. If the reference resource fails to provide an exact match for the token t, then the expansion module 208 may consult another reference resource. Section B provides more detailed information regarding one way that the expansion module 208 can make staggered and conditional use of the reference resources 106.

The reference resources 106 themselves may represent any information regarding terms that may be found in an input complaint item. Each of the reference resources 106 may be prepared and maintained by any entity or combination of entities.

In one implementation, the reference resources 106 include an acronym dictionary 210 for storing a list of accepted acronyms and their respective expanded forms. The reference resources 106 also include a set of spelling correctors. Each spelling corrector accepts a possibly-misspelled input token and returns a ranked list of candidate tokens that may represent the correct spelling of the input token. In some cases, the spelling corrector can identify a candidate token that is an exact match for the input token. That is, the spelling corrector identifies a term in its dictionary that exactly matches an input term. In addition, or alternatively, a spelling corrector can identify one or more candidate tokens that have some probability of matching the input token, but which cannot otherwise be considered exact matches. That is, the spelling corrector identifies one or more terms in its dictionary that are not exact matches for an input term, but are otherwise similar to the input term.

The spelling correctors can use any technique to generate candidate tokens. In some cases, each spelling corrector can identify a set of candidate tokens that are within a prescribed edit distance threshold of the input token. An edit distance generally quantifies the changes that are performed to transition from the original input token to a proposed candidate token, e.g., by deleting one or more characters, adding one or more characters, substituting one or more characters, and so forth. An edit distance threshold corresponds to a maximum edit distance for which a candidate token can be considered as a viable variant of an input token. In one implementation, each spelling corrector can use a trie data structure to identify candidate tokens in the above-described manner.

More specifically, the reference resources 106 can include a general-purpose spelling corrector 212 directed to domain-agnostic terms found in an entire natural language (such as English). The reference resources 106 can also include a general medical spelling corrector 214 directed to a large corpus of medical terms. The reference resources 106 can also include a high-frequency medical spelling corrector 216 directed to medical terms found with high frequency in complaint items. The reference resources 106 can also include an abbreviation-tuned spelling corrector 218 that is specifically tuned to handle abbreviations, for example by giving high priority to tokens that match the beginning of a word in a dictionary.

The above-identified list of reference resources 106 is cited by way of example, not limitation. Other environments can employ other types of reference resources, and/or can omit one or more of the types of reference resources described above.

In addition, other domains (besides the medical field) can use other domain-specific reference resources, in place of the medical reference resources mentioned above. For example, consider a building inspector who makes notes while inspecting buildings. Instead of the general medical spelling corrector 214 and the high-frequency medical spelling corrector 216, the reference resources 106 in this environment can include a general building-related spelling corrector and a high-frequency building-related spelling corrector. For example, that person might enter "fnd ck" to indicate that he or she has observed a foundation crack within the basement, and the CIN system 100 can use the above-described reference resources 106 to expand each of "fnd" and "ck" into plural candidate tokens.

Generally, the use of multiple reference resources allows the CIN system 100 to generate relevant candidate tokens, without overwhelming the CIN system 100 with too many potentially irrelevant candidate tokens. Further, this characteristic can be tuned by appropriately choosing the edit distance threshold used by each spelling corrector. For example, the general-purpose spelling corrector 212 can be assigned a relatively small edit distance threshold, which means that this spelling corrector does not recognize large deviations from the input token. This setting, in turn, prevents the general-purpose spelling corrector 212 from "flooding" the CIN system 100 with potentially irrelevant candidate tokens that will act to bog down its analysis (particularly with respect to the shortest path analysis, to be described below). In contrast, the general medical spelling corrector 214 and the high-frequency medical spelling corrector 216 can be assigned larger edit distance thresholds. The CIN system 100 can afford to set a larger threshold for these reference resources because they are more narrowly tailored to the medical domain, and thus less likely to introduce irrelevant candidate tokens into the analysis stream (compared to the general-purpose spelling corrector 212).

Next, a graph generation module 220 can generate an original graph based on the expanded complaint item generated by the expansion module 208. Generally, the original graph comprises a collection of nodes associated with the candidate tokens identified by the expansion module 208. The original graph also includes a collection of edges which connect the tokens together. From a high level perspective, the original graph defines a collection of paths. Each path comprises a series of nodes (and associated tokens) connected together by edges. Each path represents a potentially viable interpretation of the input complaint item. Section B sets forth additional details regarding one possible way of constructing the original graph.

A graph expansion module 222 revises the original graph by adding duplicate nodes and duplicate edges, to thereby generate a final expanded graph. For example, the graph expansion module 222 can add duplicate nodes so that separate ways of reaching a particular node in the original graph will terminate in separate respective nodes. For example, one way to reach a node c in the graph may involve passing through nodes $a_1$ and b, while another way to reach node c in the graph may involve passing through nodes $a_2$ and b. To address this situation, the graph expansion module 222 can add at least one duplicate of node c, so that the above-described distinct paths will now terminate in separate c-type nodes. Ultimately, this node-duplication operation enables the CIN system 100 to assign an unambiguous single weight to each edge in the graph. This capability, in turn, enables the CIN system 100 to use a shortest path algorithm to find a shortest path through the final expanded graph.

In addition, the graph expansion module 222 can add one or more end-of-complaint marker nodes to the graph and associated edges leading to and away from these nodes. The graph expansion module 222 performs this operation to formally express the possibility that a complaint item can terminate after any intermediary (non-terminal) node in the original graph. If this situation applies to a particular normalized complaint item, this means that the normalized complaint item contains two or more component complaint items. Section B provides additional details regarding the operation of the graph expansion module 222.

Advancing to FIG. 3, a weight generation module 302 can assign a weight to each edge in the final expanded graph (generated by the graph expansion module 222). Each edge points to a particular node, and that particular node is associated with a particular candidate token. To perform this task, the weight generation module 302 can generate multiple component weights for an edge in question; it then formulates a final weight for the edge based on the component weights. To generate one such component weight, the weight generation module 302 can rely on information regarding the reference resource that was used to generate the particular token (that is pointed to by the edge in question). To generate another of the component weights, the weight generation module 302 can rely on the language model 108 to identify a likelihood associated with the particular token. Section B describes additional details regarding the manner in which the weight generation module 302 can apply weights to the edges in the graph.

Once the edge weights have been assigned, a path determination module 304 finds the shortest path through the graph. The path determination module 304 can use any technique to perform this task, such as, without limitation, Djikstra's algorithm. The shortest path corresponds to an initial estimate of the normalized complaint item.

A split predictor module 306 can next examine the normalized complaint item provided by the path determination module 304 to determine whether it contains two or more embedded complaint items. More formally stated, the split predictor module 306 uses the language model 108 to determine, after each token in the normalized complaint item, the probability that the next token is associated with an end-of-complaint marker node. If this probability exceeds an environment-specific threshold, the split predictor module 306 identifies the present location in the normalized complaint item as a split point (that represents the end of one component complaint item and the start of another component complaint item). This process produces a revised normalized complaint item. Section B provides additional details regarding the operation of the split predictor module 306.

An optional post-processing module 308 can further revise the normalized complaint item by making reference to a repository 310 of complaint items. For example, the repository 310 may correspond to a local and/or remote (e.g., online) repository of definitive complaint items. For example, the repository 310 may express the definitive complaint items in UMLS form and/or some other standard form. The post-processing module 308 can use the normalized complaint item as a lookup key to determine whether the normalized complaint entry exists in the repository 310. If so, the post-processing module 308 can extract any metadata revealed by the repository 310. For example, the repository 310 may reveal that the identified normalized complaint item semantically expresses the same medical complaint as one or more other complaint items. In one case, the post-processing module 308 can use this insight to identify a single canonical complaint item that is associated with a semantically-equivalent family of complaint items.

In the final stage, the CIN system 100 can store the final normalized complaint item(s) in the mapping table (together with any supplemental metadata that is provided by the post-processing module 308). If the same input complaint item is subsequently encountered, the lookup module 202 can retrieve its normalized counterpart from the mapping table, without having to derive it again.

The CIN system 100 operates in the same manner described above with respect to other domains in which it can be applied. For example, in a law enforcement setting, the CIN system 100 can be used to expand the notations in police reports into a standardized format using a suite of reference resources pertinent to this setting. The CIN system 100 can then archive the standardized reports.

FIG. 4 shows one illustrative implementation of the training system 110 which produces the language model 108, such as an N-gram language model. The training system 110 uses a training set generation module 402 to convert an initial set of complaint items into a training set of complaint items. A data store 404 stores the initial set of complaint items, while a data store 406 stores the training set of complaint items. For example, in a medical environment, the initial set of complaint items may originate from actual complaint items entered by caregivers in a hospital, clinic, and/or other caregiving environment.

Section B, in the context of explanation of FIG. 8, provides details regarding one manner of operation of the training set generation module 402. By way of overview, the training set generation module 402 can use any manual and/or automated technique to map the initial set of complaint items to normalized counterparts. The training set generation module 402 can also filter out any complaint items that that are deemed anomalous or ambiguous.

A language model training module 408 generates at least one language model 108 based on the training set of complaint items. In general, the language model training module 408 can use any statistical technique to determine the conditional likelihoods that identified tokens will be present in future-encountered input complaint items. These likelihoods are derived based on historical information expressed by the training set of complaint items. For example, a tri-gram language model can express the probability that a token c will be encountered in a future complaint item, assuming that the preceding two tokens in the future complaint item are a and b.

Figure 5:
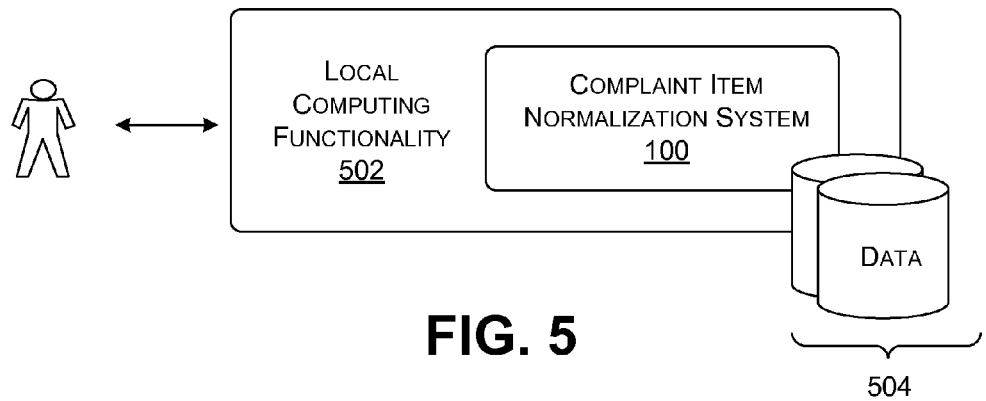
FIGS. 5 and 6 show two respective technical implementations of the CIN system of FIG. 1.

Advancing to FIG. 5, this figure shows one implementation of the CIN system 100 of FIG. 1. In this case, local computing functionality 502 implements the CIN system 100, e.g., as an application module that is locally stored by the local computing functionality 502. The local computing functionality 502 may represent any type of computing device, such as a personal computer, a computer workstation, a laptop or netbook-type computer, a game console device, a set-top box device, a personal digital assistant (PDA) device, a mobile telephone, a tablet-type computer, an electronic book-reader device, a wearable computing device, and so on. In this implementation, the local computing functionality 502 can interact with data associated with complaint items and/or models and/or reference resources stored in one or more local data stores 504.

Figure 6:
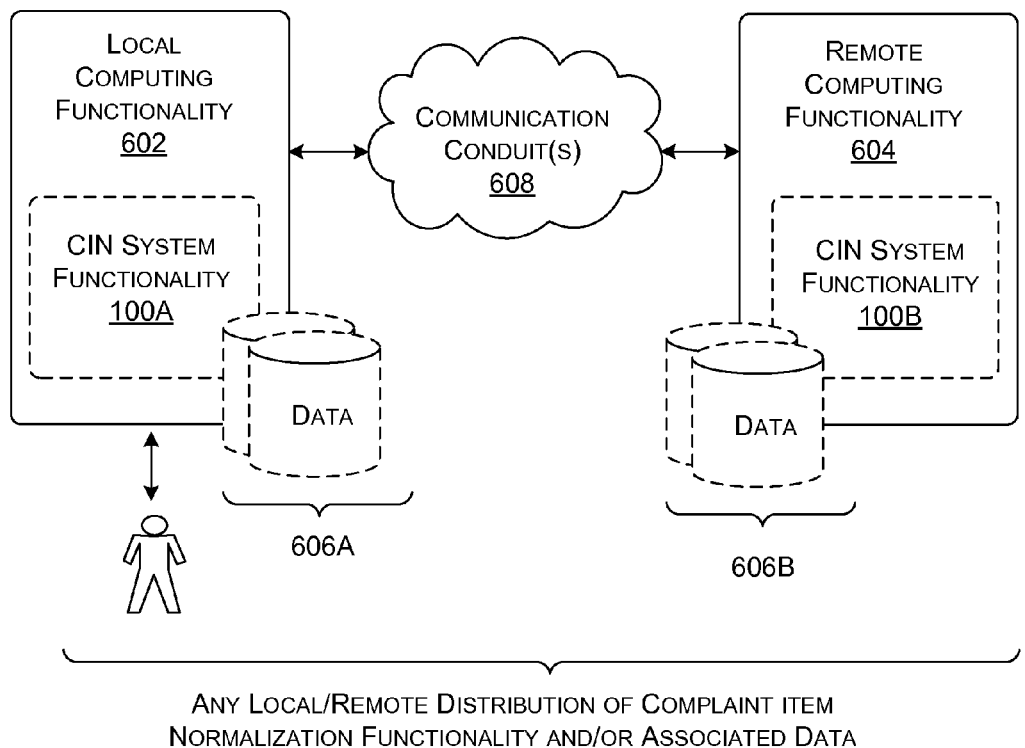

FIG. 6 shows another implementation of the CIN system 100. In this case, the CIN system 100 and the accompanying data can be distributed between local computing functionality 602 and remote computing functionality 604 in any manner. For example, in one scenario, the local computing functionality 602 can provide CIN system functionality 100A, which has access to local data store(s) 606A and/or remote data store(s) 606B. In another scenario, the remote computing functionality 604 can provide CIN system functionality 100B, which has access to data store(s) 606A and/or data store(s) 606B. In another scenario, the CIN system 100 can be implemented by a combination of the locally-implemented CIN system functionality 100A and the remote-implemented CIN system functionality 100B, with access to any of the data store(s) 606A and/or the data store(s) 606B. Still other implementations are possible.

In any of the scenarios described above with reference to FIG. 6, the user may interact with the CIN system functionality (100A and/or 100B) via the local computing functionality 602. The local computing functionality 602 may represent any type of computing device described above (with respect to FIG. 5). The remote computing functionality 604 may represent one or more server computers and associated data stores, etc., provided at a central location or distributed over plural locations. A communication conduit 608 connects the local computing functionality 602 and the remote computing functionality 604. The communication conduit 608 represents any type of local area network, any type of wide area network (e.g., the Internet), any type of point-to-point connection, and so on, or any combination thereof.

B. Illustrative Processes

FIGS. 7-10 show procedures that explain one manner of operation of the CIN system 100 of FIGS. 1-3. Since the principles underlying the operation of the CNN system 100 have already been described in Section A, certain operations will be addressed in summary fashion in this section.

Figure 7:
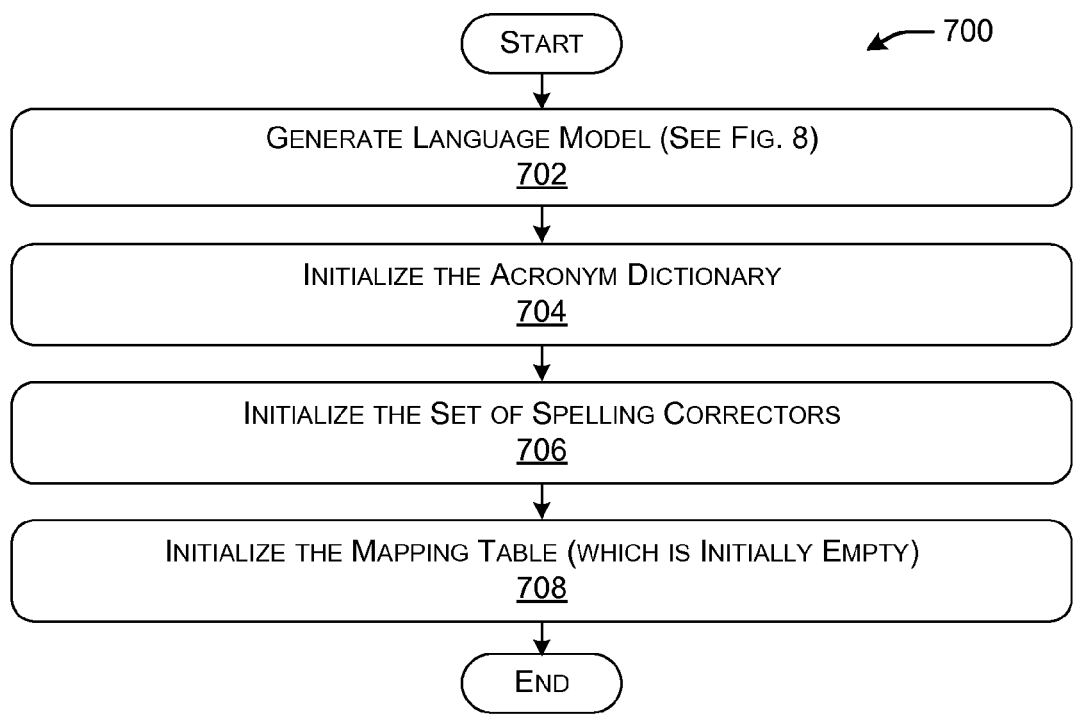
FIG. 7 shows a procedure which describes one manner of initializing the CIN system of FIG. 1.

Starting with FIG. 7, this figure shows a procedure 700 by which the CIN system 100 initializes itself for operation. In block 702, the training system 110 of the CIN system 100 generates the language model 108, such as at least a tri-gram language model. FIG. 8 (explained below) provides additional details regarding one illustrative training procedure that can be used to implement block 702.

In block 704, the CIN system 100 initializes the acronym dictionary 210. In block 706, the CIN system 100 initializes the set of spelling correctors. In block 708, the CIN system 100 initializes a mapping table. As described in Section A, the mapping table maps new complaint items to respective normalized complaint items. The mapping table is initially empty.

FIG. 8 shows a procedure 800 by which the training system 110 can generate the language model 108. In block 802, the training system 110 collects an initial set of complaint items from any source (or combination of sources). For example, in a medical environment, the training system 110 can glean the initial set of complaint items from one or more hospital databases. Those databases store complaint items that have been entered by caregivers in the course of actual care of patients.

In block 804, the training system 110 breaks each of the initial set of complaint items into one or more tokens. Each token may correspond to one more characters that are separated from a preceding and/or subsequent token by any type of non-alphanumeric character(s), such as white spaces, any type of punctuation marks, etc. Block 804 can also involve counting the number of tokens that appear in the initial set of complaint items. For example, the Training system 110 can determine that there are m occurrences of the token "cp" within the initial set of complaint items.

In block 806, the training system 110 identifies the k most frequently-occurring complaint items in the initial set of complaint items.

In block 808, the training system 110 maps each of the k most frequently-occurring complaint items to its normalized counterpart complaint item. More specifically, the training system 110 can associate each token in each initial complaint item with its counterpart token in its normalized counterpart complaint item. For example, consider the complaint item "eight wks prgnt abd pain" (which can be specified by a user in a manual manner). The normalized counterpart of this complaint item is "eight weeks pregnant abdominal pain." Accordingly, the CIN system maps: (1) "eight" to "eight"; (2) "wks" to "weeks"; (3) "prgnt" to pregnant"; (4) "abd" to "abdominal"; and (5) "pain" to "pain." As indicated, this process can map correctly-spelled words in the initial complaint item to identical correctly-spelled words in the normalized complaint item. The process also maps abbreviations in the initial complaint item to corresponding expanded terms in the normalized complaint item. The process also maps misspelled words in the initial complaint item to correctly-spelled words in the normalized complaint item. These token-level correspondences are referred to as token mappings herein.

In block 810, the training system 110 expands all of the initial complaint items in the initial set (not just the k complaint items) using the token mappings established in block 808. For example, consider the original complaint item "lower back & abd pain," which is not among the list of k most-frequently occurring initial complaint items. Based on the abd-to-abdominal token mapping established in block 808, the training system 110 expands this complaint item to its normalized counterpart "lower back & abdominal pain." Generally, the process of block 810 produces an expanded set of complain items.

In block 812, the training system 110 filters out complaint items in the expanded set of complaint items that do not satisfy environment-specific retention guidelines. For example, in one environment, the training system 110 removes any complaint item that has one or more tokens for which no respective token mapping exists. In addition, the training system 110 removes any complaint item that has one or more tokens with ambiguous mappings. For example, in some cases, a word that appears in an initial complaint item may map to two different counterpart tokens, based on two respective token mappings. This constitutes an example of an ambiguous mapping. Generally, the process of block 812 establishes a filtered set of complaint items.

Finally, in block 814, the training system 110 generates the language model 108 based on the filtered set of complaint items. For example, the training system 110 can generate a tri-gram language model of the type described above. More generally, the training system 110 can generate one or more statistical-based N-gram language models based on the filtered set of complaint items. The training system 110 can then store the language model(s) in an appropriate data store that is accessible to the training system 110.

Figure 9:
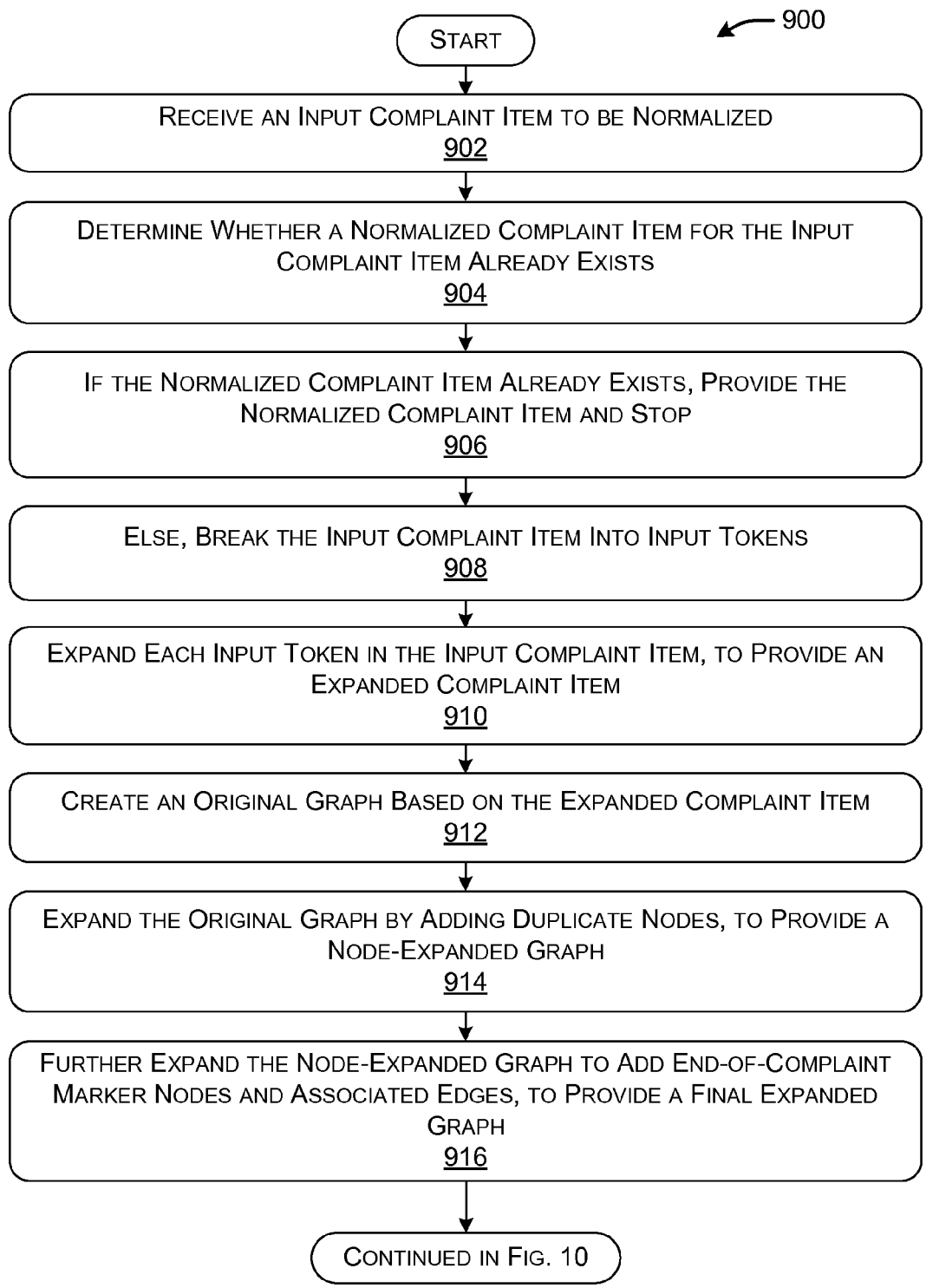
FIGS. 9 and 10 together show one illustrative manner by which the CIN system of FIG. 1 may convert a new complaint item into a corresponding normalized complaint item.
Figure 10:
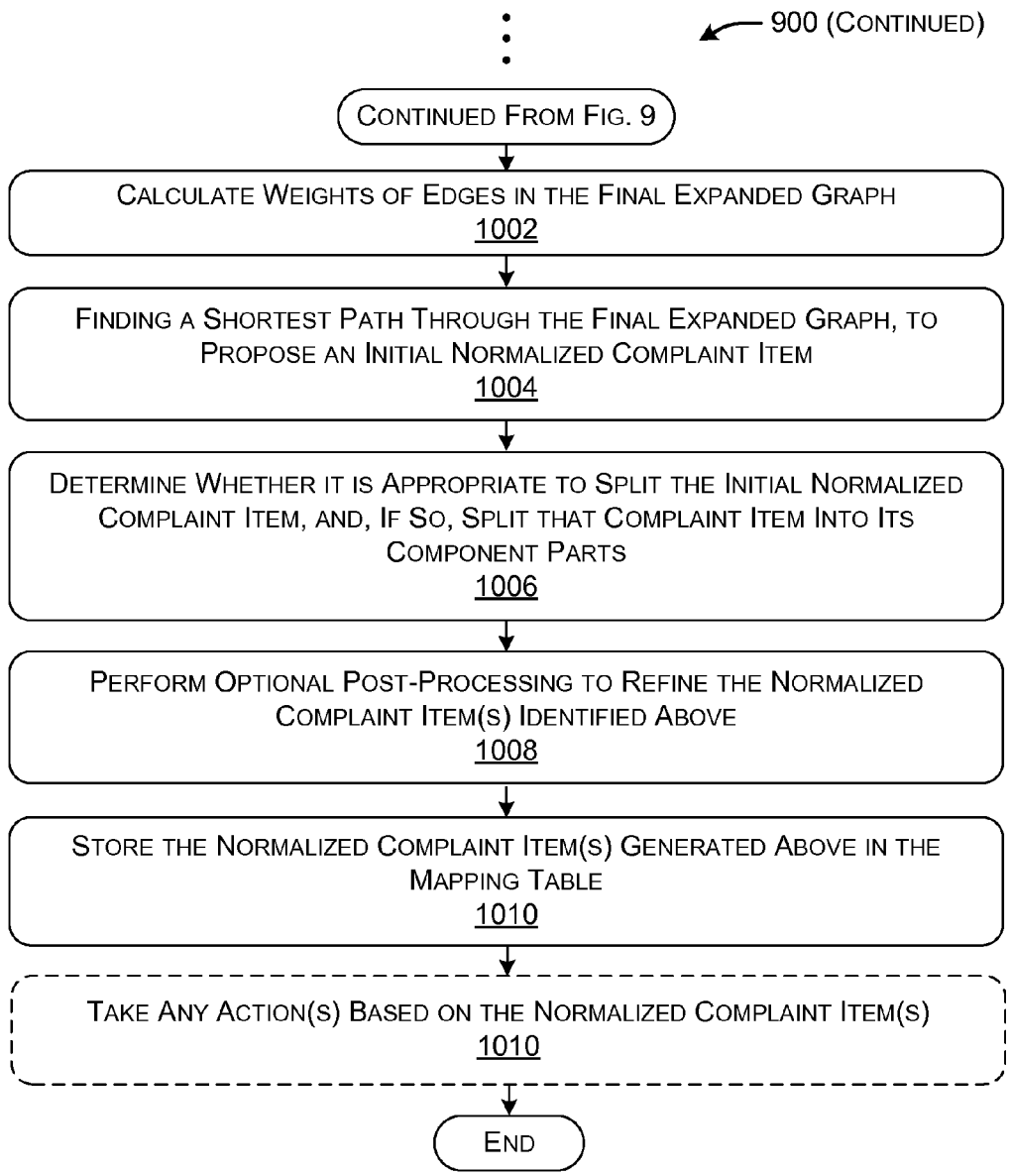

Advancing to FIGS. 9 and 10, these figures together show a procedure 900 for generating a normalized complaint item based on an input complaint item that has been received. This procedure 900 uses, in part, the language model 108 that has been generated using the procedure 800 of FIG. 8.

In block 902, the CIN system 100 receives a new input complaint item from any source. For example, a doctor or other caregiver may enter the input complaint item in the course providing care to a patient.

In block 904, the CIN system 100 consults the mapping table to determine if there is already a normalized complaint item for the input complaint item that has been received. In block 906, the CIN system 100 outputs the normalized complaint item if, in fact, it already exists. The process then terminates.

Presuming that the normalized complaint item does not already exist in the mapping table, in block 908, the CIN system 100 proceeds to generate the normalized complaint item. More specifically, in block 908, the CIN system 100 breaks the new complaint item into tokens. The CIN system 100 can perform this task by dividing the new complaint item at those junctures at which a non-alphanumeric characters appear (such as white spaces, punctuation marks, etc.). The CIN system 100 can also create a break before any sequence of digits, and a break after any sequence of digits (if not already present), e.g., by separating "6 weeks pregnant" into the three tokens "6," "weeks," and "pregnant." The CIN system 100 can also convert tokens composed of one or more numbers to text, such as by replacing the number "6" with the word "six." Finally, the CIN system 100 can also identify aggregate tokens which represent combinations of at least two smaller elementary tokens.

In block 910, the CIN system 100 expands each token in the input complaint item into an expanded list of one or more candidate tokens. Overall this process yields an expanded complaint item. The CIN system 100 can use different environment-specific rules to perform this expansion. In one illustrative and non-limiting environment, the CIN system 100 can apply the following rules to expand each token t that appears in the input complaint item.

(Rule 1) The CIN system 100 inputs the token t to the acronym dictionary 210. If an entry for this token t exists in the acronym dictionary 210, then the acronym is considered known. The CIN system 100 then proceeds to add the expanded form of the acronym (which is identified by acronym dictionary 210) to the list of candidate tokens for the input token t.

(Rule 2) The CIN system 100 next inputs the token t to the high-frequency medical corrector 216. If this corrector 216 produces an exact match (or plural exact matches), the CIN system 100 adds the exact match(es) to the list of candidate tokens for the input token t.

(Rule 3) If the lookup that is performed using the acronym dictionary 210 and the high-frequency medical spelling corrector 216 does not produce any exact matches, then the CIN system 100 next inputs the token t to the general medical spelling corrector 214. The CIN system 100 then adds all suggestions (not only exact matches) identified by the general medical spelling corrector 214 to the list of candidate tokens for the input token t.

(Rule 4) If the lookup that has been performed using the high-frequency medical spelling corrector 216 and the general medical spelling corrector 214 fails to produce any exact matches, then the CIN system 100 next inputs the token t to the abbreviation-tuned spelling corrector 218. The CIN system 100 then adds all suggestions (not only exact matches) identified by the abbreviation-tuned spelling corrector 218 to the list of candidate tokens for the input token t.

(Rule 5) If none of the spelling correctors considered so far produces any exact matches, the CIN system 100 then adds all suggestions (not only exact matches) identified by the high-frequency medical spelling corrector 216 to the list of candidate items for the input token t.

(Rule 6) At this juncture, if the CIN system 100 has still not identified any exact matches, the CIN system 100 inputs the token t to the general-purpose spelling corrector 212. The CIN system 100 then adds any suggestions (not only exact matches) that are identified by this corrector 212 to the list of candidate tokens for the input token t.

In some implementations, the CIN system 100 can apply certain exceptions to the above-described rules. For example, assume that the CIN system 100 converts a number to text (in block 908), such as by replacing the number "6" with "six." The CIN system 100 will create only one self-identical mapping for this token "six"—namely, the single candidate token "six." In contrast, assume that the original complaint item contained the word "six" (as opposed to the number 6). The CIN system 100 can potentially convert this input token into plural candidate tokens. This strategy is predicated on the assumption that there is no ambiguity in the number 6, whereas there is potential ambiguity in the word "six."

In block 912, the CIN system 100 generates an original graph based on the expanded complaint item identified in block 910. Generally, the original graph comprises a collection of nodes associated with candidate tokens (identified in the above-described expansion operation) and a collection of edges which connect the candidate tokens together. More specifically, any given token in the original graph includes one or more edges that connect it to any legal prior tokens in the original graph. Further any given token in the graph includes one or more edges that connect it to any legal subsequent tokens in the original graph. In some cases, a token's prior token will correspond to a "Start" token which indicates a starting point in the graph. In some cases, a token's subsequent token will correspond to an "End" token which indicates a termination point in the graph. Less formally stated, the nodes and edges in the original graph identify different legal paths for passing from the Start token to the End token. For each path, the tokens assigned to nodes along the way identify terms in a possible normalized complaint item.

For example, consider a simple case in which the input complaint item has two tokens, generically referred to as token x and token y (presented in that order). The CIN system 100 can (in block 910) expand token x into candidate tokens $x_1$, $x_2$, and $x_3$, and token y into candidate tokens $y_1$, $y_2$, $y_3$. Accordingly, token $x_1$ will have edges which connect it to tokens $y_1$, $y_2$, and $y_3$. The same is true with respect to tokens $x_2$ and $x_3$.

In some cases, a single token will map to a candidate token that includes two components. For example, the token "cp" may map to the token "chest pain" in the list of candidate tokens for "cp." To address this situation, the CIN system 100 can add an edge that links the nodes associated with "chest" and "pain." One or more other edges link the node "chest" to any of its legal prior nodes, and one or more other edges link the node "pain" to any of its legal subsequent nodes. However, because these two nodes originate from the same token ("cp"), the CIN system 100 will not add edges which emanate from the node "chest." As another feasible expansion, the CIN system 100 can also map the token "cp" to a single node, such as the node correspond to the candidate token "cap."

In another case, multiple tokens in the input complaint item may map to a single node. For example, consider an input complaint item that includes the text "p regnant," which the CIN system 100 initially breaks out into tokens for "p," and "regnant." As one possibility, the CIN system 100 can map these two tokens to a single node associated with the candidate token "pregnant." As another feasible expansion, the CIN system 100 can map these two tokens to two distinct nodes, e.g., corresponding to the candidate tokens "pain" and "pregnant," respectively.

Generally, to address the above situations, the CIN system 100 can record the manner in which nodes (and combination of nodes) relate to the original tokens in the input complaint item. For example, the CIN system 100 can record the fact that the two nodes "chest" and "pain" originate form a single token "cp" in the input complaint item.

In block 914, the CIN system 100 next expands the original graph generated in block 914 by adding duplicate nodes to it, to thereby produce a node-expanded graph. More specifically, consider a particular node in the graph, associated with a particular token. Different paths may lead to that particular node. There therefore may arise situations in which a single edge that leads to the particular node can have a different weight (as assigned, in part, by the language model 108) depending on the path which leads to the particular node. The CIN system 100 can eliminate multi-weighted edges by appropriately duplicating nodes, such that each distinct path that leads to a node is weighted in a single and unambiguous manner. Ultimately, the duplication of nodes accommodates the use of a shortest-path algorithm to determine a shortest path through the graph.

Again consider the example in which the new complaint item corresponds to "eight wks prgnt abd pain." Further assume that the token "eight" maps to a single candidate token "eight." The token "wks" maps to a list of candidate tokens including "weeks" and "works." The token "prgnt" maps to a list of candidate tokens including "pregnant" and "print." The token "abd" maps to the single candidate token "abdominal." And the token "pain" maps to the single candidate token "pain." In this case, the CIN system 100 will create original nodes for "eight," "weeks," "works," "pregnant," "print," "abdominal," and "pain."

The original graph, however, contains single edges which reflect plural histories. For example, one way to reach the node "abdominal" is via the nodes the "weeks" and "pregnant." Another way to reach the node "abdominal" is via the nodes "works" and "pregnant." Hence, the single edge that connects "pregnant" and "abdominal" can have two different weights (as assigned, in part, by the language model 108), depending on the path that is taken through the original graph to reach the node "abdominal."

To address this situation, the CIN system 100 can add nodes to the original graph as follows.

1. Since there is only one context (the "Start" node) for the node "eight," the CIN system 100 only generates one "eight" node. That is, the CIN system 100 does not generate a duplicate node in this scenario.

2. Since there is only one context ("Start," "eight") for the node "weeks," the CIN system 100 only generates one "weeks" node.

3. Since there is only one context ("Start," "eight") for the node "works," the CIN system 100 only generates one "works" node.

4. Since there are two contexts ("eight weeks" and "eight works") for the node "pregnant," the CIN system 100 generates two "pregnant" nodes. That is, the CIN system 100 generates a first "pregnant" node for the history ("pregnant" |"eight weeks") and a second "pregnant" node for the history ("pregnant"|"eight works").

5. Since there are two contexts ("eight weeks" and "eight works") for the "print" node, the CIN system 100 generates two "print" nodes. That is, the CIN system 100 generates a first "print" node for the history ("print"|"eight weeks") and a second "print" node for the history ("print"|"eight works").

6. For the node "abdominal," there are four contexts ("weeks pregnant," "works pregnant," "weeks print," and "works print"). Hence, the CIN system 100 generates four nodes for this scenario, e.g., corresponding to the respective histories: ("abdominal" |"weeks pregnant"); ("abdominal" |"weeks print"); ("abdominal"|"works pregnant"); and ("abdominal"|"works print").

7. For the node "pain," there are two contexts ("pregnant abdominal" and "print abdominal"). Hence, the CIN system 100 generates two nodes for "pain" associated with the following histories: ("pain"|"pregnant abdominal"); and ("pain"|"print abdominal").

In block 914, the CIN system 100 adds further nodes and edges to the node-expanded graph to account for the possible termination of a normalized complaint item after each token in the normalized complaint item. More specifically, as described above, a single normalized complaint item may contain two distinct sub-complaint items that are packaged together. To address this situation, the CIN system 100 takes into consideration that each token in a normalized complaint item may represent the end of one sub-complaint item and the start of another. The CIN system 100 formally expresses this possibility by adding one or more end-of-complaint marker nodes to the node-expanded graph, and appropriate edges which link to these marker nodes. This process produces a final expanded graph. The graph shown in FIG. 12 (to be described below) further clarifies the use of end-of-complaint marker nodes.

Advancing to FIG. 10, in block 1002, the CIN system 100 now adds weights to each of the edges in the final expanded graph (produced by the procedure 900 of FIG. 9). The CIN system 100 can use different environment-specific rules to assign weights to respective edges. In one illustrative and non-limiting case, the CIN system 100 assigns a weight to each edge that is derived, in turn, based on multiple component weights. And different considerations can be used to derive each component weight. In one implementation, the CIN system 100 can generate three illustrative component weights as follows.

(1) The CIN system 100 identifies a particular node that is pointed to by an edge in question. The CIN system 100 then identifies the reference resource from which the candidate token associated with this node originated (e.g., the acronym dictionary 210, a particular spelling corrector, etc.). The CIN system 100 then assigns a component weight to this edge that depends on the reference source that was used. This per-resource component weight can be empirically-determined or learned; generally speaking, different reference resources are more favorably weighted than others, based on the assessed accuracy of their recommendations.

(2) The CIN system 100 can compute the edit distance between a particular input token and a candidate token associated with a particular node. The CIN system 100 can then assign a component weight to an edge, leading to the particular node, based on the edit distance. In one implementation, the CIN system 100 can compute the edit distance as exp(−distance/maxDistance), where distance is the edit distance between the input token and the particular candidate token in question, and maxDistance is the maximum edit distance considered by all the spelling correctors, e.g., corresponding to the maximum edit distance threshold.

(3) The CIN system 100 can use the language model 108 to determine the likelihood associated with a node (and its corresponding candidate token) that the edge under consideration points to. For example, consider the node "abdominal," which is reached through the nodes "weeks" and "pregnant." The CIN system 100 can use a tri-gram language model 108 to compute the likelihood of "abdominal," conditional on the two preceding nodes being "weeks" and "pregnant." The CIN system 100 can then assign a component weight to the edge under consideration that depends on the likelihood provided by the language model 108.

In a variant of situation (3), the CIN system 100 can determine a component weight that represents a combination of likelihoods provided by different types of language models. For example, to determine the likelihood of "abdominal" in the above case, the CIN system 100 can combine together the likelihoods of ("abdominal"|"weeks pregnant") (as provided by a tri-gram language model), ("abdominal"|"pregnant") (as provided by a bi-gram language model), and ("abdominal") without reference to any preceding nodes (as provided by a uni-gram language model).

Once all of the component weights are generated, the CIN system 100 can generate a final weight that is some function of the component weights. For example, in one implementation, the CIN system 100 can generate the final weight for an edge based on the equation: final weight=−(sum(log of all component weights identified in (1), (2), and (3) above)).

In block 1004, the CIN system 100 can then find the shortest path through the graph provided in block 1002 above, starting at the "Start" node and ending at the "End" node. The CIN system 100 can use any type of algorithm to perform this task, such as Djikstra's algorithm. In this approach, the weights assigned to the edges metaphorically represent distances between the respective pairs of nodes connected by the edges. The shortest-possible path through the graph corresponds to an initial assessment of the normalized complaint item (corresponding to the input complaint item that was received in block 902 of FIG. 9).

In block 1006, the CIN system 100 determines whether it is appropriate to split the normalized complaint item identified in block 1004 into two (or more) parts. More specifically, as stated above, a new complaint item may actually include two or more sub-complaint items. In this case, the normalized complaint item includes two severable parts. To make this determination, the CIN system 100 can use the language model to assess the probability of a split point after each token in the normalized complaint item. For example, in a tri-gram model, the CIN system 100 can determine, for any two preceding tokens x and y, what is the probability of the next token being an end-of-complaint marker node. The CIN system 100 can designate a likely split point whenever this likelihood exceeds an environment-specific threshold.

Whenever the CIN system 100 identifies any such split, it can separate the normalized complaint item into two parts, at the juncture of the split. The CIN system 100 can also split a normalized complaint item based on the presence of explicit conjunctions in the normalized complaint item (as in "right foot and leg pain") and implicit conjunctions (as in "right foot leg pain"). In the above example, the CIN system 100 considers the possibility that any normalized complaint item may contain two component complaint items; but the CIN system 100 can apply the same consideration to parse the normalized complaint item into any number of parts.

In block 1008, the CIN system 100 can optionally perform post-processing on the normalized complaint item identified above. For example, the CIN system 100 can use the normalized complaint item identified above as a lookup key to determine whether a corresponding entry exists in the repository 310. The CIN system 100 can then mine that repository 310 for other information regarding the normalized complaint item in question. As explained in Section A, the CIN system 100 may use insight gained in this process to link together different normalized complaint items that have the same meaning, even though they use different terms.

In block 1010, the CIN system 100 stores the normalized complaint item derived above, and any supplemental metadata provided in block 1008.

In block 1012, the CIN system 100 can take any action in response to deriving the normalized complaint item. Illustrative actions were identified in Section A.

As a final point, FIGS. 9 and 10 were described in the context of processing performed on a single new complaint item that is input by a user or other entity. But the CIN system 100 can also use the procedures of FIGS. 9 and 10 to normalize a batch of new complaint items, e.g., by acting on these new complaint items in series and/or in parallel.

Figure 11:
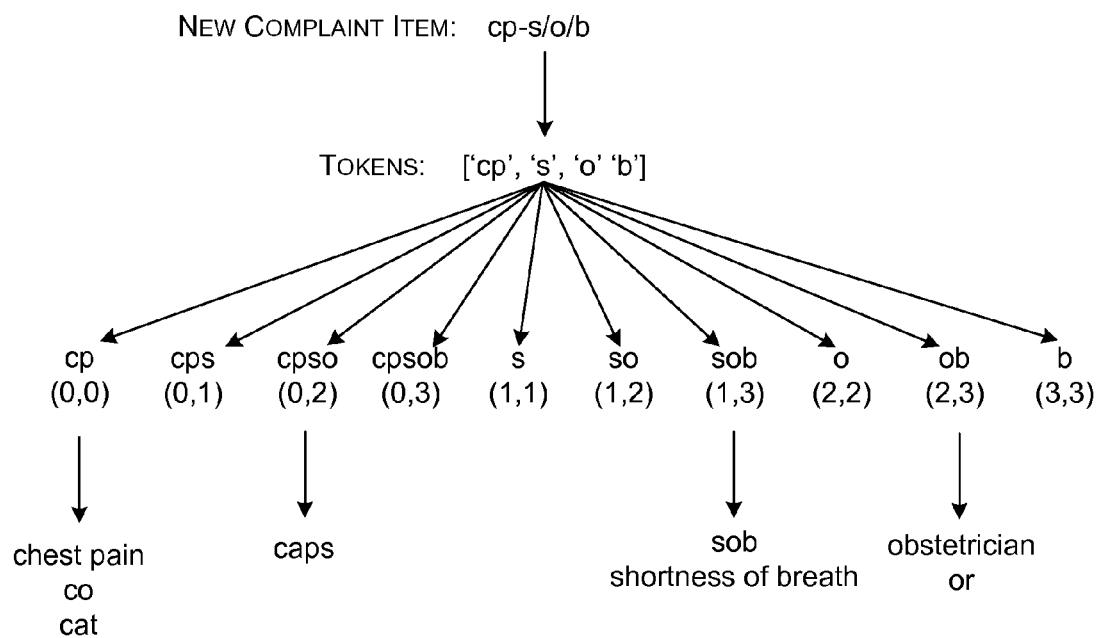
FIG. 11 is an example of one manner in which the CIN system of FIG. 1 can be used to expand tokens in a new complaint item, to produce an expanded complaint item.

FIG. 11 is example of one manner in which the CIN system 100 of FIG. 1 can be used to expand tokens in a new complaint item, to produce an expanded complaint item. In this example, the user inputs the complaint item "cp-s/o/b," which means, in normalized form, "chest pain shortness of breath." The CIN system 100 first breaks the input complaint item into its smallest token components, e.g., "cp," "s," "o," and "b." The CIN system 100 then maps each token t in the complaint item into a list of one or more candidate tokens. For example, the CIN system 100 maps the token "cp" to the following list of candidate tokens: "chest pain," "co," and "cat."

Also note that the CIN system 100 can also identify aggregate tokens which are formed by making various combinations of the smallest-level tokens described above (e.g., e.g., "cp," "s," "o," and "b"). These aggregate tokens correspond to "cps," "cpsob", "so," "sob," and "ob." The CIN system 100 can also identify a list of candidate tokens for each of the aggregate tokens. For example, the CIN system 100 can map the token "sob" to "sob" and "shortness of breath."

Figure 12:
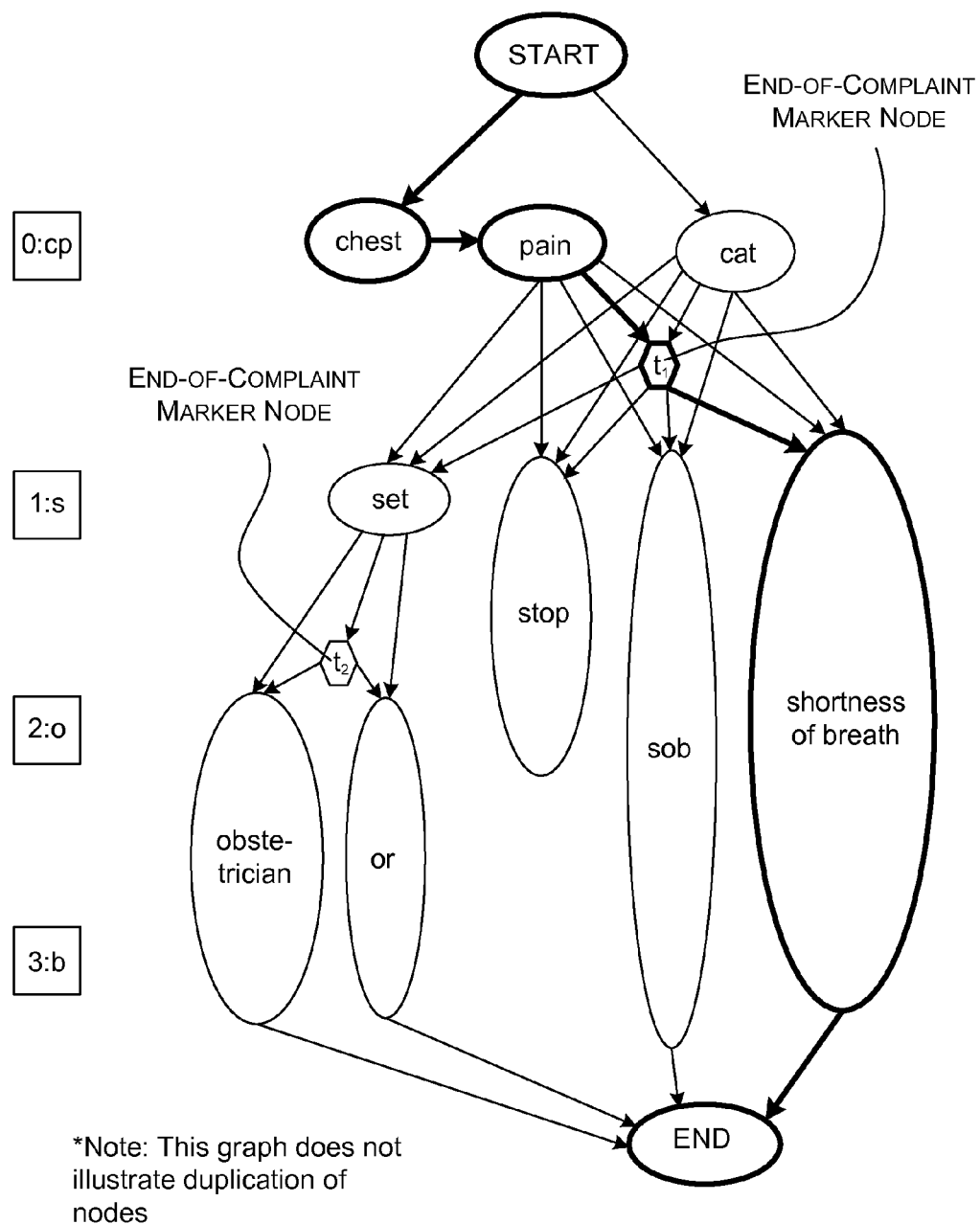
FIG. 12 is a representation of a graph that the CIN system can use to express an expanded complaint item.

FIG. 12 is a representation of a graph that the CIN system 100 can use to express an expanded complaint item. In this case, the user has again input the original complaint item "cp-s/o/b," which means, in normalized form, "chest pain shortness of breath." To simplify the depiction, the graph shown in FIG. 12 does not show the inclusion of duplicate nodes (although it will in fact contain them in practice). Also note that FIG. 12 shows a few more candidate tokens that are not illustrated in FIG. 11 (e.g., "set," "stop," etc.).

Several observations may be made regarding the graph of FIG. 12. First, the graph establishes a plurality of paths leading from the top-most "Start" node to the bottom-most "End" node. Each path represents a potentially viable interpretation of the input complaint item. For example, one interpretation is "Start"→"cat"→"sob"→"End," another is "Start"→"chest pain"→"set"→"obstetrician"→"End," and so on. The shortest path through the graph represents the sequence "Start"→"chest pain"→"shortness of breath"→"End." This sequence represents an initial proposal for the normalized complaint item. ("Shortest" in this context is measured in the context of weights assigned to the edges, not spatial distance.)

Second, note that the candidate token "chest pain" maps to a single token "cp" that appears in the original complaint item. The CIN system 100 draws an edge from "chest" to "pain" to indicate the relationship between these terms. Further, the CIN system 100 maintains bookkeeping which indicates that the double-word token "chest pain" originates from the input token "cp." As a further observation, note that no edges emanate from "chest," because the "end" of this aggregate candidate token is "pain," not "chest."

Third, note that some of the candidate tokens in the graphs are formed based on the aggregation of two or smaller tokens in the complaint item. For example, the candidate token "shortness of breath" derives from an aggregation the smaller tokens "s," "o," and "b."

Fourth, note that the initially-proposed normalized complaint item ("Start"→"chest pain"→"shortness of breath"→"End") contains two component complaint items, namely "chest pain" and "shortness of breath." The CIN system 100 can formally establish this fact by using the language model 108 to determine the probability that "chest pain" will be followed by the end-of-complaint marker node $t_1$. If this probability exceeds an environment-specific threshold, the CIN system 100 establishing a split point at this juncture.

C. Representative Computing functionality

FIG. 13 sets forth illustrative computing functionality 1300 that can be used to implement any aspect of the functions described above. For example, the computing functionality 1300 can be used to implement any aspect of CIN system of FIG. 1, e.g., as implemented by the equipment of FIG. 5 or FIG. 6. In another case, the computing functionality 1300 can be used to implement the training system 110 of FIG. 4. In one case, the computing functionality 1300 may correspond to any type of computing device that includes one or more processing devices. In all cases, the computing functionality 1300 represents one or more physical and tangible processing mechanisms.

The computing functionality 1300 can include volatile and non-volatile memory, such as RAM 1302 and ROM 1304, as well as one or more processing devices 1306 (e.g., one or more CPUs, and/or one or more GPUs, etc.). The computing functionality 1300 also optionally includes various media devices 1308, such as a hard disk module, an optical disk module, and so forth. The computing functionality 1300 can perform various operations identified above when the processing device(s) 1306 executes instructions that are maintained by memory (e.g., RAM 1302, ROM 1304, or elsewhere).

More generally, instructions and other information can be stored on any computer readable medium 1310, including, but not limited to, static memory storage devices, magnetic storage devices, optical storage devices, and so on. The term computer readable medium also encompasses plural storage devices. In all cases, the computer readable medium 1310 represents some form of physical and tangible entity.

The computing functionality 1300 also includes an input/output module 1312 for receiving various inputs (via input modules 1314), and for providing various outputs (via output modules). One particular output mechanism may include a presentation module 1316 and an associated graphical user interface (GUI) 1318. The computing functionality 1300 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area network, a wide area network (e.g., the Internet), etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by computing functionality, for converting an input linguistic item into to a normalized linguistic item, the method executed by one or more processing devices of the computing functionality, the method comprising:
   receiving the input linguistic item;
   partitioning the input linguistic item into one or more tokens;
   expanding each of the tokens in the input linguistic item into a list of one or more candidate tokens, to provide an expanded linguistic item;
   creating a graph based on the expanded linguistic item;
   assigning weights to edges in the graph, using, at least in part, a statistical language model; and
   identifying a shortest path through the graph, to thereby identify a normalized linguistic item which represents a normalized counterpart of the input linguistic item.

2. The method of claim 1, wherein the linguistic item expresses a medical-related complaint.

3. The method of claim 1, wherein said expanding comprises expanding each of the tokens in the input linguistic item using plural reference sources.

4. The method of claim 3, wherein the plural reference sources include any two or more of:
   an acronym dictionary comprising a list of known acronyms;
   a general-purpose spelling corrector for providing a spell-checking service directed to domain-agnostic terms used in a natural language;
   a general domain-specific spelling corrector for providing a spell-checking service directed to terms in a particular domain;
   a high-frequency spelling corrector for providing a spell-checking service directed to terms found with high frequency in linguistic items in the particular domain; and
   an abbreviation-tuned spelling corrector for providing a spell-checking service directed to abbreviations.

5. The method of claim 4, wherein the particular domain corresponds to a medical-related field.

6. The method of claim 1, wherein the graph that is created constitutes an original graph, the method further comprising:
   adding a duplicate node to the original graph, wherein the duplicate node is a duplicate of an existing node in the original graph,
   said adding being performed to take account of two different paths that lead to the existing node,
   said adding being performing one or more times to generate a node-expanded graph.

7. The method of claim 6, further comprising:
   adding an edge that extends from a non-terminal node in the node-expanded graph to an end-of-complaint marker node, expressing a possibility the non-terminal node represents an end of a component complaint item within the normalized complaint item,
   said adding of the edge being performed one or more times to create a final expanded graph.

8. The method of claim 1, wherein said assigning of weights comprises:
   for each edge that points to a particular node, generating plural component weights; and
   assigning a final weight to the edge based on a combination of the plural component weights.

9. The method of claim 8, wherein the plural component weights comprise:
   a first component weight that is based on a type of reference resource that is used to generate a candidate token that is associated with the particular node;
   a second component weight that is based on an edit distance between the token associated with the particular node, and a corresponding original token in the input linguistic item; and
   a third component weight that is based on a likelihood, provided by the statistical language model, of the particular token associated with the particular node.

10. The method of claim 1, wherein the statistical language model is a tri-gram language model.

11. The method of claim 1, further comprising using the statistical language model to determine whether the normalized linguistic item includes a split point that demarcates two component linguistic items within the normalized linguistic item.

12. A computer readable storage device for storing computer readable instructions, the computer readable instructions providing a linguistic item normalization system when executed by one or more processing devices, the computer readable instructions comprising:

logic configured to receive an input linguistic item;

logic configured to use a statistical language model to generate a normalized linguistic item, the normalized linguistic item represents a normalized counterpart of the input linguistic item, the normalized linguistic item comprises a normalized version of semantic content of the input linguistic item; and logic configured to use the statistical language model to also determine whether the normalized linguistic item includes a split point that demarcates two component linguistic items within the normalized linguistic item.

13. The computer readable storage device of claim 12, wherein the linguistic item expresses a health-related complaint.

14. The computer readable storage device of claim 12, wherein said logic configured to generate a normalized linguistic item comprises:

logic configured to partition the input linguistic item into one or more tokens;

logic configured to expand each of the tokens in the input linguistic item into a list of one or more candidate tokens, to provide an expanded linguistic item;

logic configured to create a graph based on the expanded linguistic item;

logic configured to assign weights to edges in the graph, using, at least in part, the statistical language model; and logic configured to identify a shortest path through the graph, to thereby identify the normalized linguistic item.

15. The computer readable storage device of claim 14, wherein said logic configured to expand comprises logic configured to expand each of the tokens in the linguistic item using plural reference sources.

16. A complaint item normalization system, implemented by computing functionality, for converting an input complaint item into a normalized complaint item, comprising:

a tokenization module configured to partition the input complaint item into one or more tokens;

an expansion module configured to expand each of the tokens in the input complaint item into a list of one or more candidate tokens based on plural reference sources, to provide an expanded complaint item;

a graph generation module configured to create a graph based on the expanded complaint item; and a path determination module configured to generate a normalized complaint item based on the graph, the normalized complaint item representing a normalized counterpart of the input complaint item.

17. The complaint item normalization system of claim 16, wherein the plural reference sources include:

an acronym dictionary comprising a list of known acronyms;

a general-purpose spelling corrector for providing a spell-checking service directed to domain-agnostic terms used in a natural language;

a general medical spelling corrector for providing a spell-checking service directed to terms in a medical-related domain;

a high-frequency spelling corrector for providing a spell-checking service directed to terms found with high frequency in linguistic items in the medical-related domain; and an abbreviation-tuned spelling corrector for providing a spell-checking service directed to abbreviations.

18. The complaint item normalization system of claim 17, wherein at least two of the spelling correctors identify candidate tokens using different respective edit distance thresholds.

19. The complaint item normalization system of claim 16, further comprising a weight generation module configured to assign weights to edges in the graph, using, at least in part, a statistical language model.

20. The complaint item normalization system of claim 16, further comprising a split predictor model configured to use a statistical language model to determine whether the normalized complaint item includes at least two component complaint items.

\* \* \* \* \*